United States Patent [19]
Beneker et al.

[11] Patent Number: 5,826,944
[45] Date of Patent: Oct. 27, 1998

[54] CONNECTOR FORMATION BETWEEN SEAT AREAS OF A MOTOR VEHICLE SEAT

[75] Inventors: Wilfried Beneker, Sulingen; Carsten Reith, Niedernwöhren, both of Germany

[73] Assignee: Bertrand Faure Sitztechnik GmbH & Co. KG, Stadthagen, Germany

[21] Appl. No.: 816,881

[22] Filed: Mar. 13, 1997

[30] Foreign Application Priority Data

Mar. 19, 1996 [DE] Germany ................. 196 10 826.8

[51] Int. Cl.$^6$ ................................................. A47C 7/00
[52] U.S. Cl. ..................... 297/440.2; 297/440.21; 297/452.18; 403/297
[58] Field of Search ............... 297/440.2, 440.21, 297/452.18, 452.2, 216.15, 440.16; 403/297, 294, 292, 373, 261, 248, 194, 197

[56] References Cited

U.S. PATENT DOCUMENTS

| | | | |
|---|---|---|---|
| 4,850,646 | 7/1989 | Weiland | 403/297 X |
| 4,890,888 | 1/1990 | Kostin | 297/440.21 |
| 5,005,908 | 4/1991 | Young | 297/440.21 |
| 5,123,706 | 6/1992 | Granzow et al. | 297/452.18 |
| 5,246,271 | 9/1993 | Boisset | 297/452.2 X |
| 5,253,923 | 10/1993 | Gootee | 297/440.21 |
| 5,269,589 | 12/1993 | Brothers et al. | 297/440.21 X |
| 5,328,248 | 7/1994 | Nishiyama | 297/452.18 X |
| 5,382,083 | 1/1995 | Fecteau et al. | 297/452.18 X |
| 5,671,974 | 9/1997 | Boycott et al. | 297/440.21 X |

FOREIGN PATENT DOCUMENTS

| | | | |
|---|---|---|---|
| 4233944 | 4/1994 | Germany | 297/452.18 |

Primary Examiner—Jose V. Chen
Assistant Examiner—Rodney B. White
Attorney, Agent, or Firm—Pollock, Vande Sande & Priddy

[57] ABSTRACT

An apparatus for connecting first and second seat areas is provided. The first and second seat area extend substantially with each other and each of the first seat areas have a corresponding second seat which it is connected to. The apparatus comprises a receiving bore fixed to one of the first and second seat areas. A threaded stem penetrates at least one connected set of the first and second areas crosswise through the receiving bore. The threaded stem has a conical spreading area and bears a nut on the side opposite the conical spreading area such that the threaded stem is freely movable axially on one side. A spreading bush encompasses the threaded stem. When the threaded stem is tightened by means of the nut, the spreading bush spreads outward over the conical spreading area and a face of the spreading bush rests firmly against one of the seat areas, an inner contour of the spreading bush rests firmly against the conical spreading area, and an outer periphery of the spreading bush rests firmly against an inner wall of the receiving bore.

13 Claims, 3 Drawing Sheets

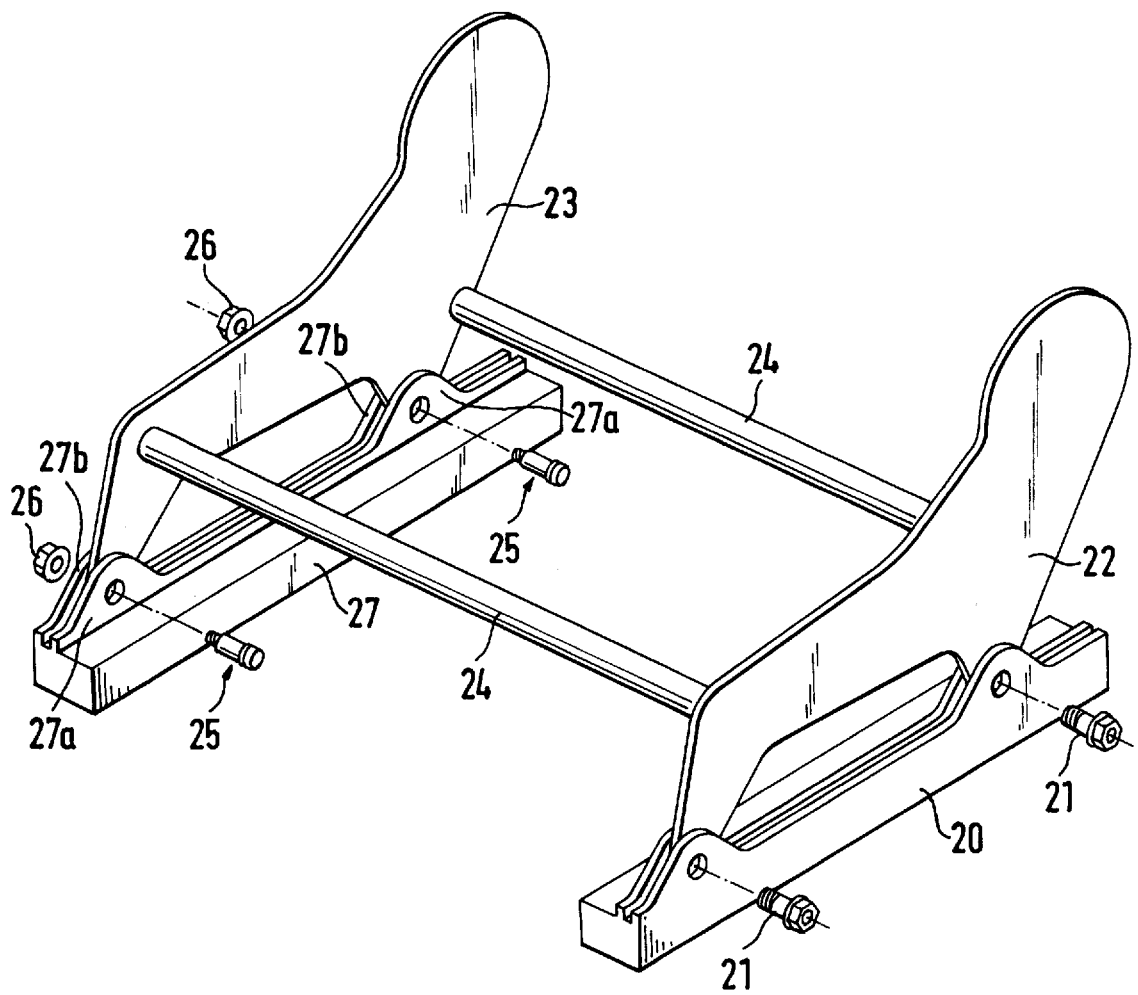

CONNECTOR FORMATION BETWEEN SEAT AREAS OF A MOTOR VEHICLE SEAT

FIELD OF THE INVENTION

The invention relates to the interconnection of components of a motor vehicle seat.

BACKGROUND OF THE INVENTION

It is difficult to assemble motor vehicle seats in a stress-free manner. The stresses result from production-related deviations in dimension of the seat frame parts during the fabrication of such parts. Thus, it is not feasible to ensure that the principle fastening surfaces of the two back-rest beams always maintain the same distance from each other as the corresponding underpart areas to which the frames are fastened. Under certain circumstances, considerable stresses result when the two frame sides are screwed together with the related underparts of the seat frame. The result of these considerable stresses is that the axes of the tilt adjustment fittings for adjusting the tilt of the back-rest, are not in exact alignment. Because of this, tilt adjustment in some cases requires considerably greater adjusting forces than can be attributed to the two tilt adjustment fittings themselves. In addition, uneven operating forces at the two fittings can result.

SUMMARY OF THE INVENTION

The invention is directed to the technical problem of creating a connection using means in a novel manner which make it possible to connect two seat areas with each other in such a way that despite production tolerances of the seat areas, the two seat areas are connected stress-free with each other.

The connection formation according to the invention solves the problem of a stress-free assembly of seat areas parallel to each other in a simple manner. Thus, a typical connection, for example a typical screw connection, can be chosen on one side of the two seat areas. A firm, stress-free connection results on the opposite parallel side, when the connection elements according to the invention are used. Unlike connections with screws, as provided for until now, when attaching and/or tightening the connecting elements, the seat areas to be connected with each other do not shift in longitudinal direction of the threaded stem. Rather, when tightening, the connection is made exactly with the correlation of the frame parts to be connected, as it results in the case of fitting together at a push-on/slip-on connection. In doing so, considerable production tolerances can be compensated for without distortions resulting when the connecting elements are attached.

BRIEF DESCRIPTION OF THE DRAWINGS

Below, preferred forms of construction of the invention are described in detail with reference to the drawings. The drawings show:

FIG. 3 is a diagram of a seat underframe area that is connected with two longitudinal rails.

DETAILED DESCRIPTION OF THE PREFERRED EMBODIMENT(S)

Figure 1:
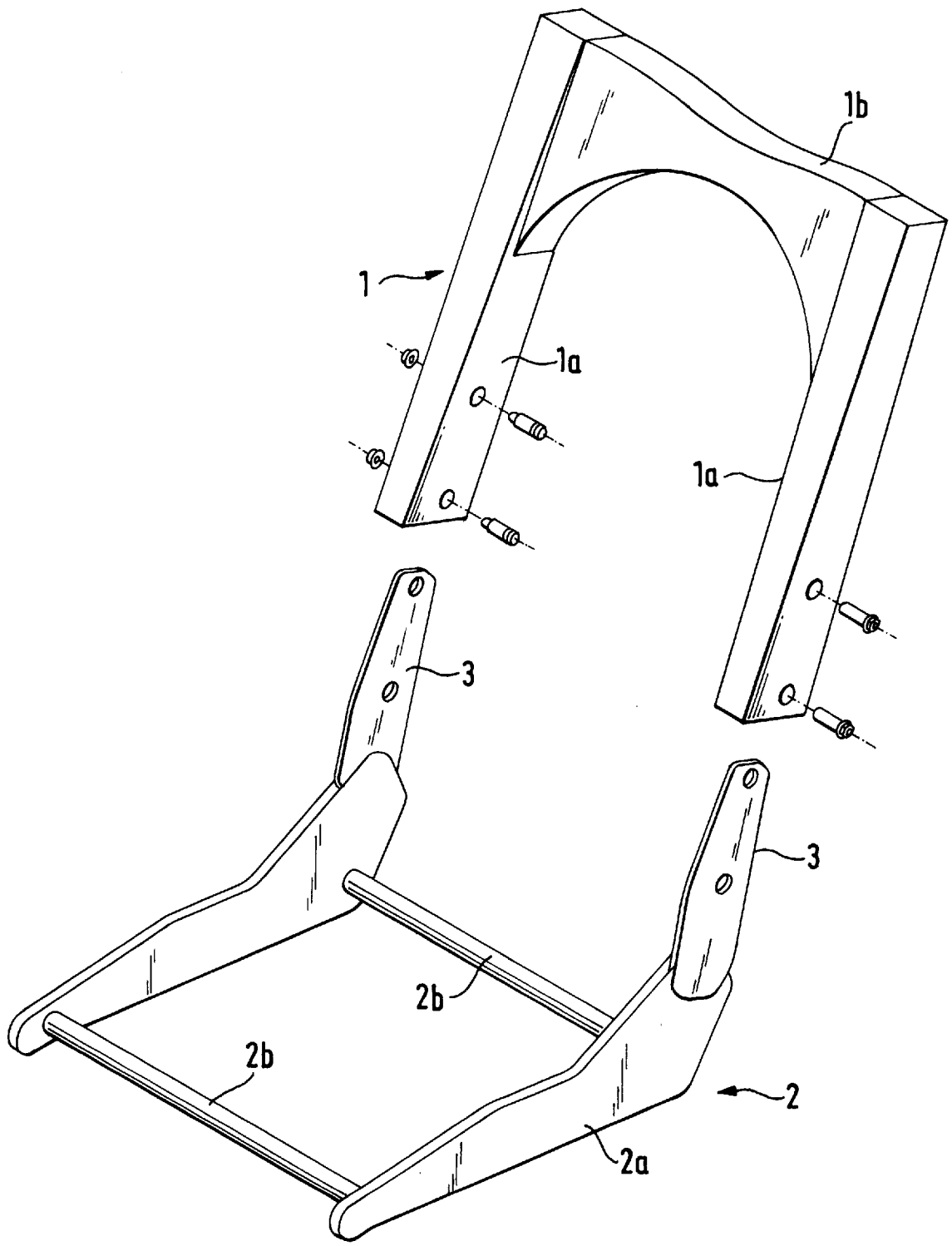
FIG. 1 is an exploded view, in a diagrammatic form and incomplete in the lower area, of a motor vehicle seat frame.

The seat frame is illustrated in a very diagrammatic manner. In FIG. 1, a U-shaped, upper back-rest frame area 1 is provided having two longitudinal back-rest beams 1a connected by a cross-beam 1b. The longitudinal beams 1a are connected with upwardly projecting members 3 referred to as "swords". Both swords usually rest against tilt adjustment fittings provided on both sides and which are in turn connected with the seat underframe 2 which has two lateral beams 2a and two cross-links 2b. Significant to the explanation of the present invention are the junction points between the left longitudinal beam 1a according to FIG. 1 and the sword 3 insertable into beams 1a.

Figure 2:
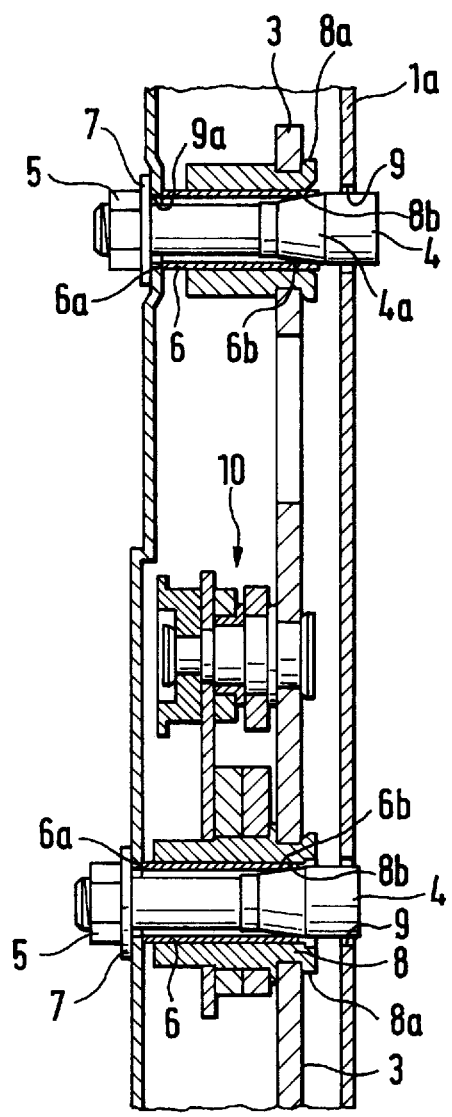
FIG. 2 is a longitudinal section of two junction points between the side beam shown in FIG. 1 on the left and a so-called "sword"

FIG. 2 shows a longitudinal section of the junction between beams 1a and the respective "swords" 3. The longitudinal back-rest beam 1a rests on openings 9 and 9a arranged on opposite legs is penetrated by a threaded stem 4. The threaded stem 4 has a conical spreading area 4a.

As shown in FIG. 2, pushed over the left area of the threaded stem is a spread bushing 6 that has a circumferential weakened area 6b designed with a groove. The spread bushing rests with its left face against the edge area of the opening 9a. From the outside, the opening 9a is covered by a plain washer on which a nut 5 is situated. The spread bushing 6 rests with its outer periphery firmly against the wall of a cylindrical receiving bore 8b of a bush 8. The bush 8 has a collar 8a and runs crosswise to the sword 3.

Parts of a folding mechanism for a back-rest of a two-door car are designated by numeral 10; these are not essential to the present invention and are therefore not described in detail.

After the two back-rest longitudinal beams 1a are slipped over the related "swords" 3, the right back-rest longitudinal beam, for example, is according to FIG. 1, first connected with the related sword 3 in a conventional manner; they may, for example, be fastened with screws. This connection produces a certain relative positioning of, e.g., the right back-rest longitudinal beam, shown in FIG. 1, to the respective sword 3. In this relative position after the mounting of the right back-rest longitudinal beam, the left sword 3 and the left back-rest longitudinal beam are now fastened.

To secure the left beam to the left sword 3, the spread bushing 6 is pushed through the receiving bore 8b of the bushing 8, which is firmly connected with the sword 3. The threaded stem is then pushed from the left through the bore 9 until its conical area 4a rests against the inside of the spread bushing 6. After a plain washer 7 is threaded onto the threaded area projecting through the opposite bore 9a; a nut 5 is screwed on. When the nut 5 is tightened, this causes the spread bushing 6 to rest with its face 6a firmly pressing from the inside against the back-rest longitudinal beam, on the one hand. At the same time, the spread bushing 6 is pressed outwardly by the conical area 4a, in such a way that the spread bushing 6 rests against the conical area 4a on the one hand and, on the other hand, presses firmly against the wall of the receiving bore 8b in the bushing 8. A firm clamping connection is created in this way. This clamping connection allows a secure fastening between the sword 3 and the back-rest lateral beam 1a, a fastening which, during tightening, is unchanged in relation to its initial position.

It can be seen that in the illustrated embodiment, the cylindrical right end area of the threaded stem 4 protrudes several millimeters over the inner face of the back-rest longitudinal beam 1a. Furthermore, it can be seen from the drawing that the left face of the bushing 8 maintains a distance of several millimeters from the edge of the bore 9a. It is also easy to see that the described clamping/squeezing connection between the back-rest longitudinal beam 1a and the sword 3 is also possible when the sword 3 is arranged a few millimeters to the left in relation to the illustrated position, without the fastening elements needing any changes in relation to the illustrated dimensions.

Since the threaded area of threaded stem 4 also protrudes to the left over the nut 5, the components can also be fastened with identically sized fastening elements if the sword 3 were shifted to the right by the area protruding over the nut 5.

FIG. 3 shows diagrammatically a further embodiment for an alternative application. In this form of construction, two lateral side beams 22 and 23 of a seat underframe are connected with each other by two cross-rods 24. The lateral beams 22 and 23 have downwardly pointing flap areas. The longitudinal beam 22 is connected via its two downwardly pointing flap areas with a lateral rail 20 and screwed onto the lateral rail with conventional bolts 21.

The lateral beam 23 also has two downwardly pointing flap areas positioned between upwardly projecting, parallel flanges 27a and 27b. The distance between the insides of flanges 27a and 27b is substantially greater than the thickness of the downwardly pointing flaps. The result of this is that the downwardly pointing flaps of the beam 23 can occupy different positions between the two flanges 27a and 27b. Securing takes place with the same connecting elements, as already described in connection with FIGS. 1 and 2. In this form of construction, the threaded stem 4 is designated by 25. This threaded stem penetrates the aligned passages or bores in the flanges 27a and 27b as well as a spread bushing (not shown) positioned inside a receiving bore of the respectively connected flap of lateral beam 23. When tightening the threaded stem 25 by means of nut 26, the fastening, already described in connection with FIGS. 1 and 2, takes place between the upwardly projecting flanges 27a and 27b as well as the lateral beam's 23 flap areas encompassed by the flanges.

What is claimed is:

1. An apparatus for connecting first seat areas and second seat areas extending substantially parallel with each other, each of said first seat areas corresponding to one of said second seat areas for connection thereto, said apparatus comprising:

a receiving bore fixed on one of said first and second seat areas;

a threaded stem having a conical spreading area, said threaded stem penetrating at least one corresponding set of first and second seat areas crosswise through said receiving bore and bearing a nut on an end opposite of said conical spreading area, said threaded stem being freely moveable axially on one end; and a spread bushing encompassing said threaded stem such that when said threaded stem is tightened by means of said nut, said spread bushing spreads outward over said conical spreading area whereby a face of said spread bushing rests firmly against one of said seat areas, an inner contour of said spread bushing rests firmly against said conical spreading, and an outer periphery of said spread bushing rests firmly against an inner wall of said receiving bore.

2. The apparatus of claim 1 wherein said first and second seat areas are fastened to each other with two threaded stems, two spread bushings, and two nuts.

3. The apparatus according to claim 2, wherein the spread bushing has a circumferential weakening area.

4. The apparatus according to claim 2, wherein the first seat area is designed as hollow section and the second seat area is a flap extending into the hollow section.

5. The apparatus according to claim 1, wherein the spread bushing has a circumferential weakening area.

6. The apparatus according to claim 5, wherein the first seat area is designed as hollow section and the second seat area is a flap extending into the hollow section.

7. The apparatus according to claim 5, wherein the first seat area is a lateral beam of a seat underframe and the second seat area is a lateral rail of a seat underframe.

8. The apparatus according to claim 1, wherein the first seat area is designed as hollow section and the second seat area is a flap extending into the hollow section.

9. The apparatus according to claim 8, wherein the first seat area is a lateral beam of a seat underframe and the second seat area is a lateral rail of a seat underframe.

10. The apparatus according to claim 8, wherein the hollow section is a backrest longitudinal beam.

11. The apparatus according to claim 10, wherein the first seat area is a lateral beam of a seat underframe and the second seat area is a lateral rail of a seat underframe.

12. The apparatus according to claim 1, wherein the first seat area is a lateral beam of a seat underframe and the second seat area is a lateral rail of a seat underframe.

13. The apparatus according to claim 2 wherein the first seat area is a lateral beam of a seat underframe and the second seat area is a lateral rail of a seat underframe.

* * * * *

UNITED STATES PATENT AND TRADEMARK OFFICE
CERTIFICATE OF CORRECTION

PATENT NO. : 5,826,944
DATED : October 27, 1998
INVENTOR(S) : Wilfried Beneker
Carsten Reith It is certified that error appears in the above-identified patent and that said Letters Patent is hereby corrected as shown below:

IN the Title: CONNECTOR should be CONNECTION

Column 1, line 1, change "CONNECTOR" to --CONNECTION--.

Signed and Sealed this

Twenty-third Day of February, 1999

Attest:

Q. TODD DICKINSON

Attesting Officer     Acting Commissioner of Patents and Trademarks